United States Patent
Matsumoto et al.

(10) Patent No.: US 10,946,744 B2
(45) Date of Patent: Mar. 16, 2021

(54) VEHICULAR PROJECTION CONTROL DEVICE AND HEAD-UP DISPLAY DEVICE

(71) Applicant: JVCKENWOOD Corporation, Yokohama (JP)

(72) Inventors: Masaki Matsumoto, Yokohama (JP); Makoto Kurihara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/787,076

(22) Filed: Feb. 11, 2020

(65) Prior Publication Data

US 2020/0171951 A1 Jun. 4, 2020

Related U.S. Application Data

(63) Continuation of application No. PCT/JP2018/011306, filed on Mar. 22, 2018.

(30) Foreign Application Priority Data

Sep. 14, 2017 (JP) .............................. JP2017-176845

(51) Int. Cl.
*G02B 27/01* (2006.01)
*B60K 35/00* (2006.01)
(Continued)

(52) U.S. Cl.
CPC .............. *B60K 35/00* (2013.01); *G01C 21/36* (2013.01); *G02B 27/0101* (2013.01); *G09G 5/37* (2013.01);
(Continued)

(58) Field of Classification Search
None
See application file for complete search history.

(56) References Cited

U.S. PATENT DOCUMENTS

2002/0055808 A1\* 5/2002 Matsumoto .......... G01C 21/365
701/1
2005/0071082 A1 3/2005 Ohmura et al.

FOREIGN PATENT DOCUMENTS

EP 1521059 A1 \* 4/2005 ........... G01C 21/365
JP 2000-275057 10/2000
(Continued)

OTHER PUBLICATIONS

International Search Report and Written Opinion for International Patent Application No. PCT/JP2018/011306 dated Jun. 19, 2018, 12 pages.

*Primary Examiner* — Parul H Gupta
(74) *Attorney, Agent, or Firm* — Amin, Turocy & Watson, LLP

(57) ABSTRACT

A device includes a vehicle information acquisition part configured to acquire vehicle information containing a vehicle speed, a visibility information acquisition part configured to acquire visibility information on a road for travelling, a virtual vehicle video generation part configured to generate a virtual vehicle video of a virtual vehicle, which is to be moving ahead of a host vehicle in the same direction as the host vehicle, and a projection control part configured to control projection of the virtual vehicle video by a projection unit, such that a virtual image of the virtual vehicle video generated by the virtual vehicle video generation part is visually recognized in front of the host vehicle.

8 Claims, 9 Drawing Sheets

(51) Int. Cl.
*G01C 21/36* (2006.01)
*G09G 5/37* (2006.01)

(52) U.S. Cl.
CPC .......................... *B60K 2370/1529* (2019.05); *B60K 2370/165* (2019.05); *B60K 2370/166* (2019.05); *B60K 2370/167* (2019.05); *B60K 2370/176* (2019.05); *B60K 2370/21* (2019.05); *G02B 2027/014* (2013.01); *G02B 2027/0138* (2013.01); *G02B 2027/0141* (2013.01); *G09G 2354/00* (2013.01)

(56) References Cited

FOREIGN PATENT DOCUMENTS

| | | |
|---|---|---|
| JP | 2003-254764 | 9/2003 |
| JP | 2005-106663 | 4/2005 |
| JP | 2005-107916 | 4/2005 |
| JP | 2005-127996 | 5/2005 |
| JP | 2005-214730 | 8/2005 |

* cited by examiner

V

VEHICULAR PROJECTION CONTROL DEVICE AND HEAD-UP DISPLAY DEVICE

CROSS-REFERENCE TO RELATED APPLICATIONS

This application is a continuation of PCT international application Ser. No. PCT/JP2018/011306 filed on Mar. 22, 2018 which designates the United States, incorporated herein by reference, and which claims the benefit of priority from Japanese Patent Application No. 2017-176845, filed on Sep. 14, 2017, incorporated herein by reference.

BACKGROUND

1. Technical Field

The present disclosure relates to a vehicular projection control device and a head-up display device.

2. Description of the Related Art

A head-up display device is known that projects information provided to the driver, such as route guidance information or speed information, as a virtual image in front of the driver's line of sight. A technique is known that displays an image of a leading virtual vehicle, which is travelling ahead of the host vehicle by a predetermined distance on a guidance route, on the windshield at a position that would be visible from the driver's viewpoint, and thereby guides the host vehicle (for example, see Japanese Laid-open Patent Publication No. 2000-275057 A). A technique is known that displays a virtual vehicle, which teaches an action to be taken by a vehicle, at a position ahead of the vehicle by a predetermined distance (for example, see Japanese Laid-open Patent Publication No. 2003-254764 A).

When the visibility is low because, for example, the illuminance is low or the view is unclear due to the weather, if there is no preceding vehicle, it may be difficult to recognize traffic lanes and/or guardrails, and thus may be difficult to drive. Further, the driver may feel uneasy about driving due to low visibility.

The present disclosure has been made in consideration of the above, and has an object to facilitate driving when the visibility is low.

SUMMARY

It is an object of the present disclosure to at least partially solve the problems in the conventional technology.

In order to solve the above problem and achieve the object, a vehicular projection control device includes a vehicle information acquisition part configured to acquire vehicle information containing a vehicle speed of a host vehicle, a visibility information acquisition part configured to acquire visibility information on a road on which the host vehicle travels, a virtual mobile body video generation part configured to generate a virtual mobile body video of a virtual mobile body, which is to be projected by a projection unit of a head-up display device as being moving ahead of the host vehicle in a same direction as the host vehicle, a projection control part configured to control projection of the virtual mobile body video by the projection unit of the head-up display device, such that a virtual image of the virtual mobile body video generated by the virtual mobile body video generation part is visually recognized in front of the host vehicle, and a video data acquisition part configured to acquire video data from an image capturing part for capturing a front of the host vehicle. The projection control part controls projection of the virtual mobile body video, on a basis of the visibility information acquired by the visibility information acquisition part, the visibility information acquisition part acquires the visibility information, on a basis of video data acquired by the video data acquisition part, when it is determined that visibility around the host vehicle has lowered on a basis of the visibility information acquired by the visibility information acquisition part, the projection control part controls projection of the virtual mobile body video, such that a virtual image of the virtual mobile body video generated by the virtual mobile body video generation part is visually recognized in front of the host vehicle, the visibility information acquisition part acquires, as the visibility information, lighting information indicating intervals between lighting devices around the host vehicle, on a basis of video data acquired by the video data acquisition part, and when it is determined that the intervals between lighting devices around the host vehicle are wider than a threshold on a basis of the visibility information acquired by the visibility information acquisition part, the projection control part controls projection of the virtual mobile body video, such that a virtual image of the virtual mobile body video generated by the virtual mobile body video generation part is visually recognized in front of the host vehicle.

A head-up display device according to the present disclosure includes the vehicular projection control device described above and the projection unit.

DETAILED DESCRIPTION OF THE PREFERRED EMBODIMENTS

Embodiments of a vehicular projection control device and a head-up display device (which will be referred to as "HUD device") according to the present disclosure will be explained below in detail with reference to the accompanying drawings. The present disclosure is not limited to the following embodiments.

First Embodiment

Figure 1:
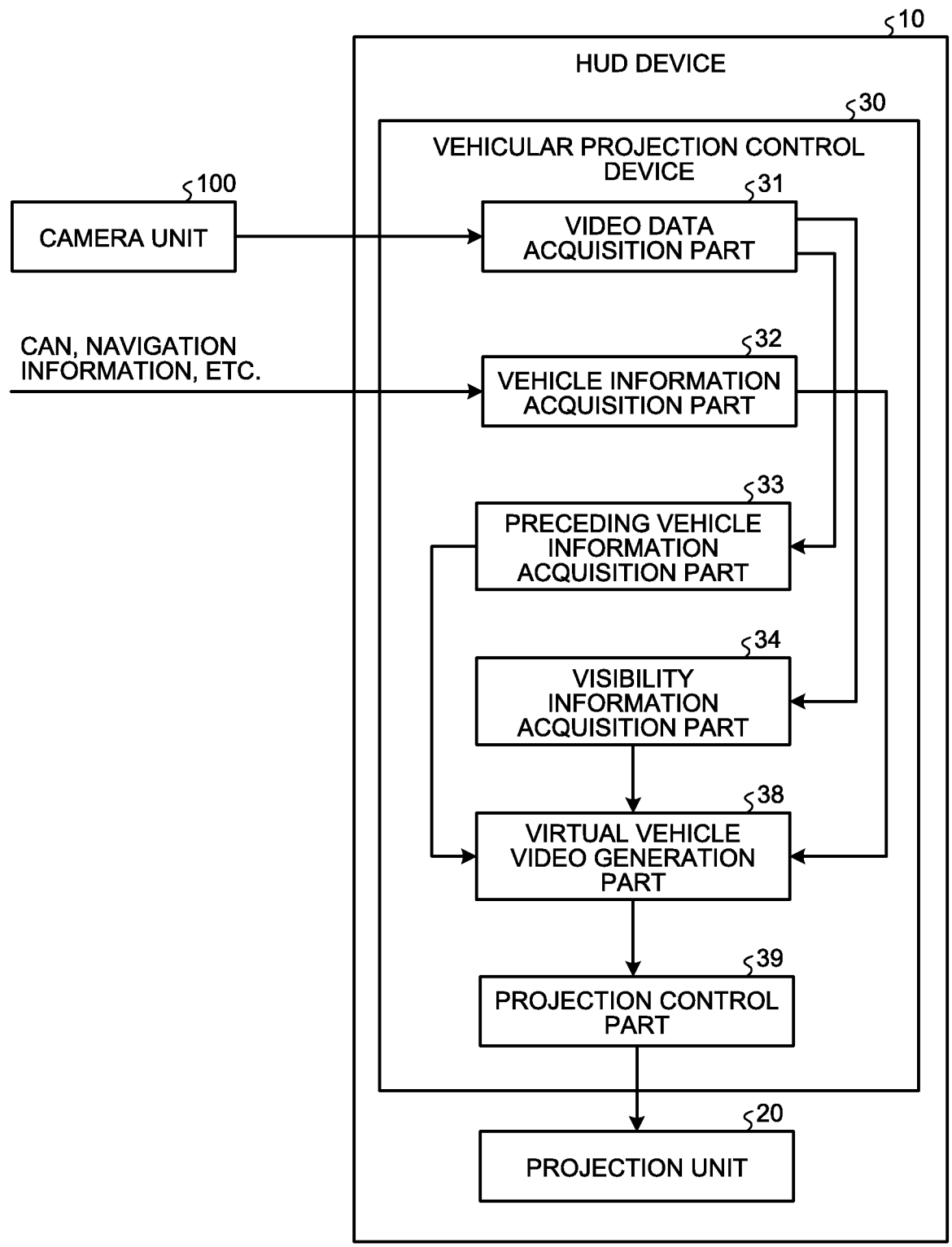
FIG. 1 is a block diagram illustrating a configuration example of a vehicular projection control device according to a first embodiment.

FIG. 1 is a block diagram illustrating a configuration example of a vehicular projection control device according to a first embodiment. An HUD device 10 controls projection of a virtual mobile body video by a vehicular projection control device 30, such that a virtual image 200 of the virtual mobile body video is visually recognized, in accordance with the situation around a host vehicle V. In this embodiment, the HUD device 10 controls projection of a virtual vehicle video by the vehicular projection control device 30, such that a virtual image 200 of the virtual vehicle video is visually recognized, when the visibility around the host vehicle V has lowered.

A camera unit 100 includes a camera that captures the surroundings of the host vehicle V. A plurality of cameras may be arranged. In this embodiment, the camera unit 100 includes a front camera (not illustrated).

The front camera is a camera for a front video. The front camera is arranged at the front of the host vehicle V, to capture the circumstance around the front of the host vehicle V. The front video data is a moving image composed of 30 image frames per second, for example. The front camera outputs the captured front video data to a video data acquisition part 31 of the vehicular projection control device 30.

Figure 5:
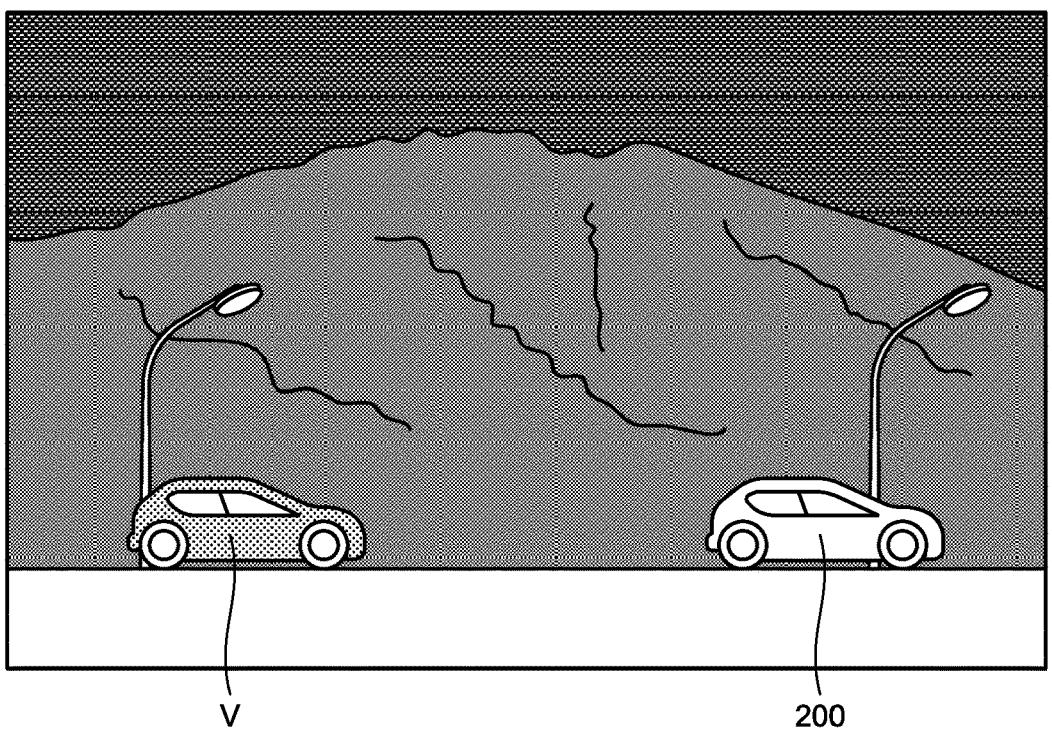
FIG. 5 is a diagram illustrating an example of a vehicle and a virtual image of a virtual vehicle video, where the vehicle is traveling in a dark mountainous area.

When the visibility around the host vehicle V has lowered, the HUD device 10 causes a virtual vehicle video of a virtual vehicle that is a virtual preceding vehicle, serving as a virtual mobile body video of the virtual mobile body, to be visually recognized by the driver as a virtual image 200 in front of the driver's line of sight (see FIG. 5). The HUD device 10 includes a projection unit 20 and the vehicular projection control device 30.

Figure 2:
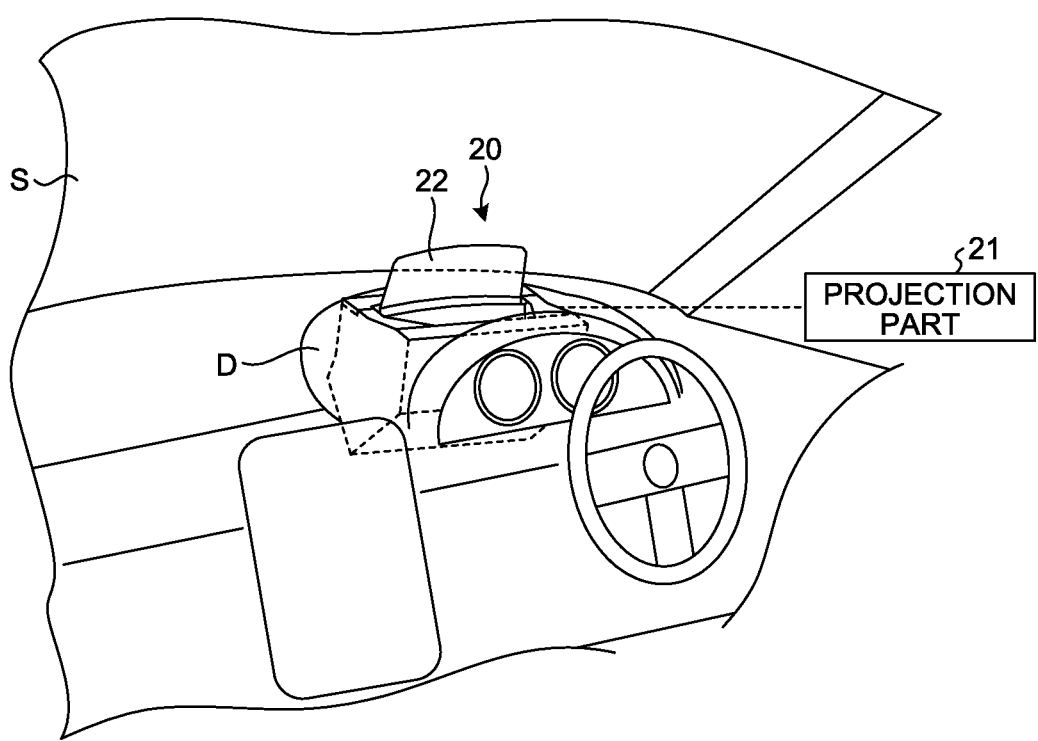
FIG. 2 is a diagram illustrating an example of a projection unit of a head-up display device according to the first embodiment.

With reference to FIG. 2, the projection unit 20 will be explained. FIG. 2 is a diagram illustrating an example of the projection unit of the head-up display device according to the first embodiment. The projection unit 20 includes a projection part 21 and a combiner 22. The projection unit 20 causes a display video projected on the projection part 21 to be reflected by the combiner 22 and to be thereby visually recognized by the driver as a virtual image.

For example, the projection part 21 is a display, which includes a liquid crystal display (LCD: Liquid Crystal Display), organic EL (Organic Electro-Luminescence) display, or the like. In this embodiment, the projection part 21 is arranged under the dashboard D. The projection part 21 displays a display video on its display face, on the basis of a video signal from a projection control part 39 of the vehicular projection control device 30. The video display light of the display video displayed on the display face of the projection part 21 is projected onto the combiner 22.

The combiner 22 reflects the video display light projected from the projection part 21 so that the video display light can be recognized by the driver as a virtual image. The combiner 22 is a plate-like member arranged in a convex shape curved forward in the traveling direction. In this embodiment, the combiner 22 is arranged on the upper side of the dashboard D. The combiner 22 has a front face opposite to the windshield S of the host vehicle V and a rear face opposite to the driver.

The vehicular projection control device 30 performs control such that the projection part 21 of the projection unit 20 projects a display video in accordance with the situation around the host vehicle V. The vehicular projection control device 30 is an arithmetic processing device configured by, for example, a CPU (Central Processing Unit) or the like. The vehicular projection control device 30 loads a program stored in a storage part (not illustrated) into a memory and executes instructions contained in the program. The vehicular projection control device 30 includes a video data acquisition part 31, a vehicle information acquisition part 32, a preceding vehicle information acquisition part 33, a visibility information acquisition part 34, a virtual vehicle video generation part (virtual mobile body video generation part) 38, and a projection control part 39. The vehicular projection control device 30 includes an internal memory (not illustrated), such that the internal memory is used for temporary storage of data inside the vehicular projection control device 30, and so forth.

The video data acquisition part 31 acquires surrounding video data obtained by capturing the surroundings of the host vehicle V. More specifically, the video data acquisition part 31 acquires video data output from the camera unit 100. The video data acquisition part 31 outputs the acquired video data to the preceding vehicle information acquisition part 33 and the visibility information acquisition part 34.

The vehicle information acquisition part 32 acquires vehicle information indicating the situation of the host vehicle V, from CAN and/or various sensors for sensing the state of the host vehicle V. For example, the vehicle information acquisition part 32 acquires vehicle speed information. The vehicle information acquisition part 32 outputs the acquired vehicle information to the virtual vehicle video generation part 38. The vehicle information acquisition part 32 stores the acquired vehicle speed information in the internal memory.

The preceding vehicle information acquisition part 33 acquires preceding vehicle information indicating the presence or absence of a preceding vehicle that is travelling ahead of the host vehicle V in traveling. In this embodiment, the preceding vehicle information acquisition part 33 performs image processing to video data acquired by the video data acquisition part 31 to determine whether a preceding vehicle is present within a range of a first distance or less, and acquires the determination result as the preceding vehicle information.

The first distance is preferably in a range of about several tens of meters or more and 200 m or less. The first distance may be set in accordance with the vehicle speed of the host vehicle V. For example, the first distance may be a safe inter-vehicle distance set in accordance with the vehicle speed of the host vehicle V. Alternatively, for example, the first distance may be a distance longer than a safe inter-vehicle distance set in accordance with the vehicle speed of the host vehicle V. For example, on the highway, the first distance may be 80 m when the vehicle speed of the host vehicle V is 80 km/h, and the first distance may be 100 m when the vehicle speed is 100 km/h. For example, on the highway, the first distance may be 100 m when the vehicle speed of the host vehicle V is 80 km/h, and the first distance may be 200 m when the vehicle speed is 100 km/h.

Alternatively, the preceding vehicle information acquisition part 33 may determine whether a preceding vehicle is present within a range of the first distance or less by a sensor unit (not illustrated), and acquire the determination result as the preceding vehicle information. The sensor unit can detect a preceding vehicle that is an obstacle ahead of the host vehicle V. The sensor unit includes a plurality of sensors disposed around the host vehicle V. Each of the sensors is arranged at the front of the host vehicle V, and detects a vehicle ahead of the host vehicle V. For example, each of the sensors is an infrared sensor, an ultrasonic sensor, a millimeter-wave radar, or the like, or may be configured by a combination thereof.

The visibility information acquisition part 34 acquires visibility information of the road on which the host vehicle V travels. The visibility information acquisition part 34 outputs the acquired visibility information to the virtual vehicle video generation part 38 and the projection control part 39.

The visibility information is information indicating the visibility in front of the host vehicle V as part of the surroundings thereof. For example, the visibility information is illuminance information indicating the illuminance in front of the host vehicle V, lighting information indicating the intervals between lighting devices disposed on the road on which the host vehicle V travels, visibility range information indicating a visibility range that is the visible distance of sight in front of the host vehicle V, and/or weather information including fog, mist, haze, rain, and/or snow. In this embodiment, the visibility information is illuminance information.

In this embodiment, the visibility information acquisition part 34 performs image processing to video data acquired by the video data acquisition part 31 to acquire the brightness of the video as the illuminance information.

The visibility information acquisition part 34 may acquires, as the visibility information, illuminance acquired on the basis of a detection result, in such a way that the detection result is output from a illuminance sensor (not illustrated), which is disposed on the host vehicle V to detect the illuminance in front of the host vehicle V, and is acquired by a detection result acquisition part (not illustrated).

The visibility information acquisition part 34 may perform image processing to video data acquired by the video data acquisition part 31, and acquire, as the lighting information, the intervals between lighting devices disposed on the road on which the host vehicle V travels. Alternatively, the visibility information acquisition part 34 may measure the intervals between lighting devices by a ranging sensor, and acquire the intervals as the lighting information.

The visibility information acquisition part 34 may refers to a database, which stores visibility range information indicating a visibility range that is the visible distance of sight in front of the host vehicle V, or weather information including fog, mist, haze, rain, and/or snow, or may receive such information, to acquire the visibility information.

The virtual vehicle video generation part 38 generates a virtual vehicle video of a virtual vehicle, which is to be projected by the projection unit 20 of the HUD device 10 as being moving ahead of the host vehicle V in the same direction as the host vehicle V. When the visibility around the host vehicle V has lowered, the virtual vehicle video generation part 38 generates the virtual vehicle video.

In this embodiment, the virtual vehicle video is a video of a virtual vehicle that is moving ahead of the host vehicle V by the first distance. In this embodiment, the virtual vehicle video is a video of the host vehicle V visually recognized from behind. The virtual vehicle video is generated by changing the viewpoint in accordance with the shape of the road ahead of the host vehicle V by the first distance. For example, when the road ahead of the host vehicle V by the first distance curves in the right direction, the virtual vehicle video is a video of the host vehicle V visually recognized from behind on the right side. For example, when the road ahead of the host vehicle V by the first distance curves in the left direction, the virtual vehicle video is a video of the host vehicle V visually recognized from behind on the left side.

In this embodiment, the virtual vehicle video is a video of a virtual vehicle that moves at a first vehicle speed, which is a vehicle speed used immediately before it is determined that the visibility around the host vehicle V has lowered. The virtual vehicle video is generated by changing the size in accordance with a change in the vehicle speed of the host vehicle V. For example, when the host vehicle V is traveling by keeping the first vehicle speed, the virtual vehicle video is a video having a constant size. For example, when the host vehicle V is at a vehicle speed faster than the first vehicle speed, the virtual vehicle video is a video obtained by enlarging the size of the virtual vehicle as if the inter-vehicle distance had become shorter. For example, when the host vehicle V is at a vehicle speed slower than the first vehicle speed, the virtual vehicle video is a video obtained by reducing the size of the virtual vehicle as if the inter-vehicle distance had become longer.

The projection control part 39 controls projection of the virtual vehicle video by the projection unit 20 of the HUD device 10, such that a virtual image 200 of the virtual vehicle video generated by the virtual vehicle video generation part 38 is visually recognized in front of the host vehicle V. More specifically, when the visibility around the host vehicle V has lowered on the basis of the visibility information acquired by the visibility information acquisition part 34, the projection control part 39 outputs to the projection unit 20, a video signal to project the virtual vehicle video by the projection unit 20 of the HUD device 10, such that a virtual image 200 of the virtual vehicle video generated by the virtual vehicle video generation part 38 is visually recognized in front of the host vehicle V.

In this embodiment, in the virtual vehicle video generation part 38 and the projection control part 39, when a threshold time or more has elapsed or traveling of a threshold distance or more has been made, in a state where the illuminance is a threshold illuminance or less on the basis of the acquired visibility information, it is determined that the visibility around the host vehicle V has lowered. When the illuminance is not the threshold illuminance or less, or when the threshold time or more has not yet elapsed and traveling of the threshold distance or more has not yet been made, even in a state where the illuminance is the threshold illuminance or less, it is determined that the visibility around the host vehicle V has not lowered. By adopting this arrangement, it suppresses that a virtual image 200 of a virtual vehicle video is displayed carelessly by a slight change of the visibility in traveling.

For example, the threshold illuminance may be set by acquiring in advance an average value of the brightness of video data at times when drivers recognize that it is dark around. For example, the threshold time is about 2 seconds. For example, the threshold distance is about 50 m.

Alternatively, in a case where the lighting information is acquired as the visibility information, in the virtual vehicle video generation part 38 and the projection control part 39, when it is determined that the intervals between lighting devices are wider than a threshold, it may be determined that the visibility around the host vehicle V has lowered. Alternatively, in a case where the visibility range information is acquired as the visibility information, when it is determined that the visibility range in front of the host vehicle V is shorter than a threshold value, it may be determined that the visibility around the host vehicle V has lowered. Alternatively, in a case where the weather information is acquired as the visibility information, when it is determined that the weather around the host vehicle V is fog, mist, haze, rain, and/or snow, it may be determined that the visibility around the host vehicle V has lowered.

Figure 3:
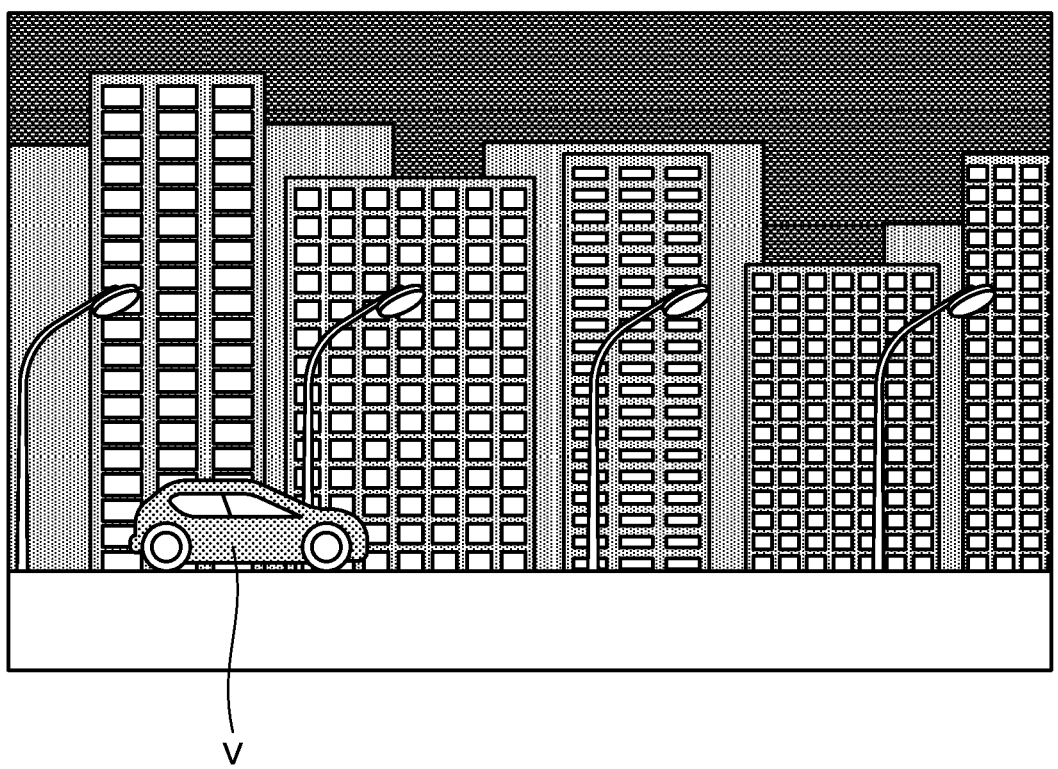
FIG. 3 is a diagram illustrating an example where a vehicle is traveling in a bright city area.
Figure 4:
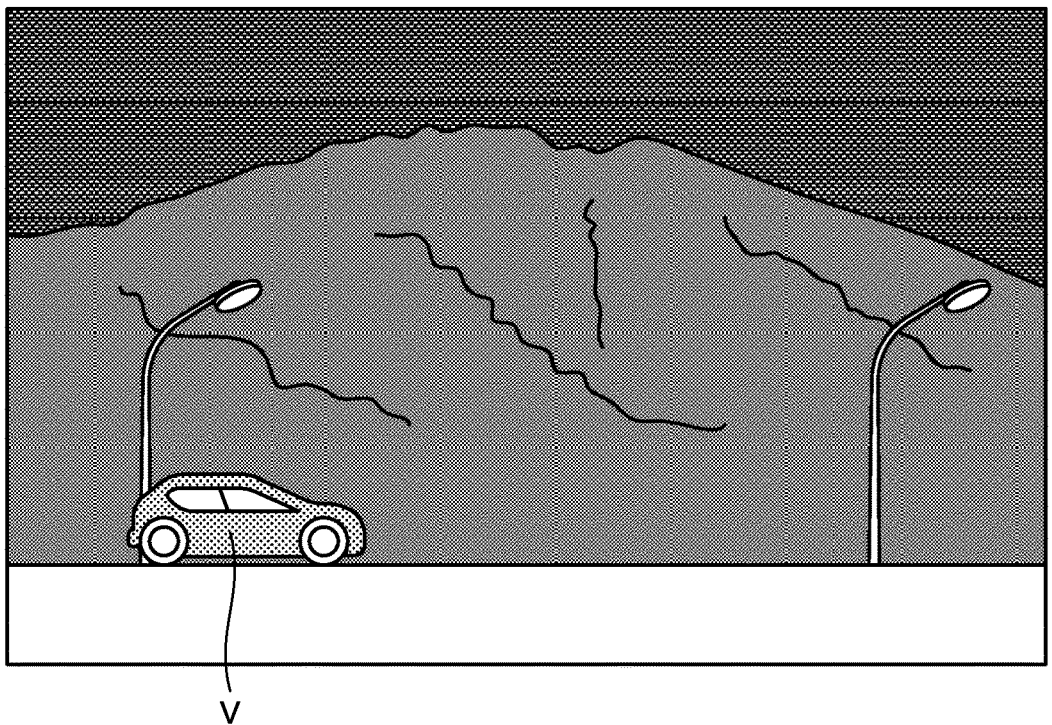
FIG. 4 is a diagram illustrating an example where a vehicle is traveling in a dark mountainous area.
Figure 6:
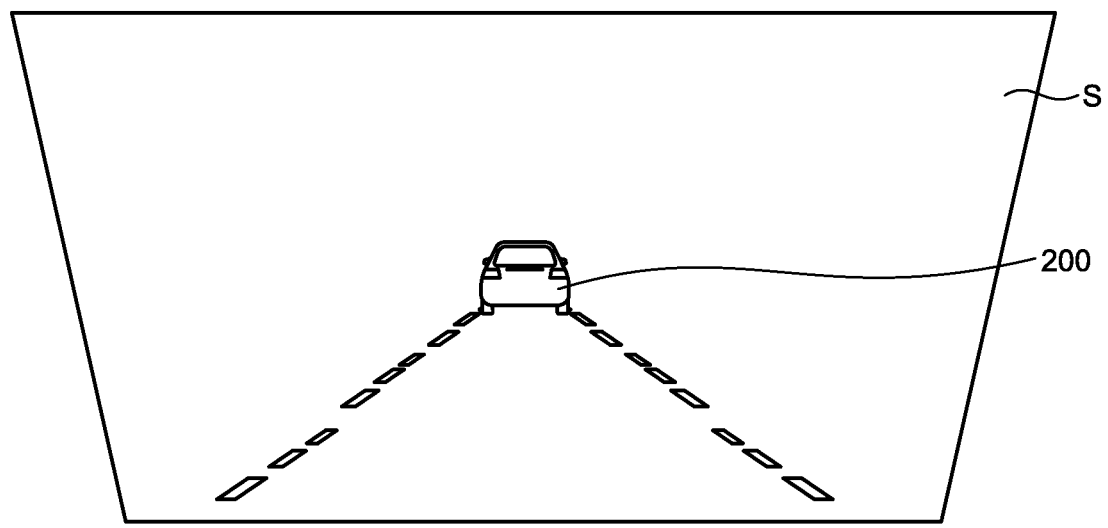
FIG. 6 is a diagram illustrating an example of a virtual image of a virtual vehicle video that is visually recognized by the driver, where the vehicle is traveling in a dark mountainous area.

With reference to FIGS. 3 to 6, an explanation will be given of a virtual image 200 of a virtual vehicle video that is projected when the visibility around a host vehicle V has lowered. FIG. 3 is a diagram illustrating an example where a vehicle is traveling in a bright city area. FIG. 4 is a diagram illustrating an example where a vehicle is traveling in a dark mountainous area. FIG. 5 is a diagram illustrating an example of a vehicle and a virtual image of a virtual vehicle video, where the vehicle is traveling in a dark mountainous area. FIG. 6 is a diagram illustrating an example of a virtual image of a virtual vehicle video that is visually recognized by the driver, where the vehicle is traveling in a dark mountainous area.

As illustrated in FIG. 3, when it is light around and the visibility is good, as in a case where the host vehicle V is traveling in a bright city area, no virtual image 200 of a virtual vehicle video is displayed.

As illustrated in FIG. 4, when it is dark around and the visibility has lowered, as in a case where the host vehicle V is traveling in a dark mountainous area, the darkness in front of the host vehicle V makes it difficult to visually recognize traffic lanes and/or guardrails. Further, the driver may feel uneasy about driving due to low visibility.

Accordingly, as illustrated in FIGS. 5 and 6, when the visibility around the host vehicle V has lowered, a virtual vehicle video is projected such that the virtual vehicle is visually recognized by the driver as being travelling ahead by the first distance. In other words, a virtual image 200 of the virtual vehicle video is projected to overlap with the scenery present ahead by the first distance.

Figure 7:
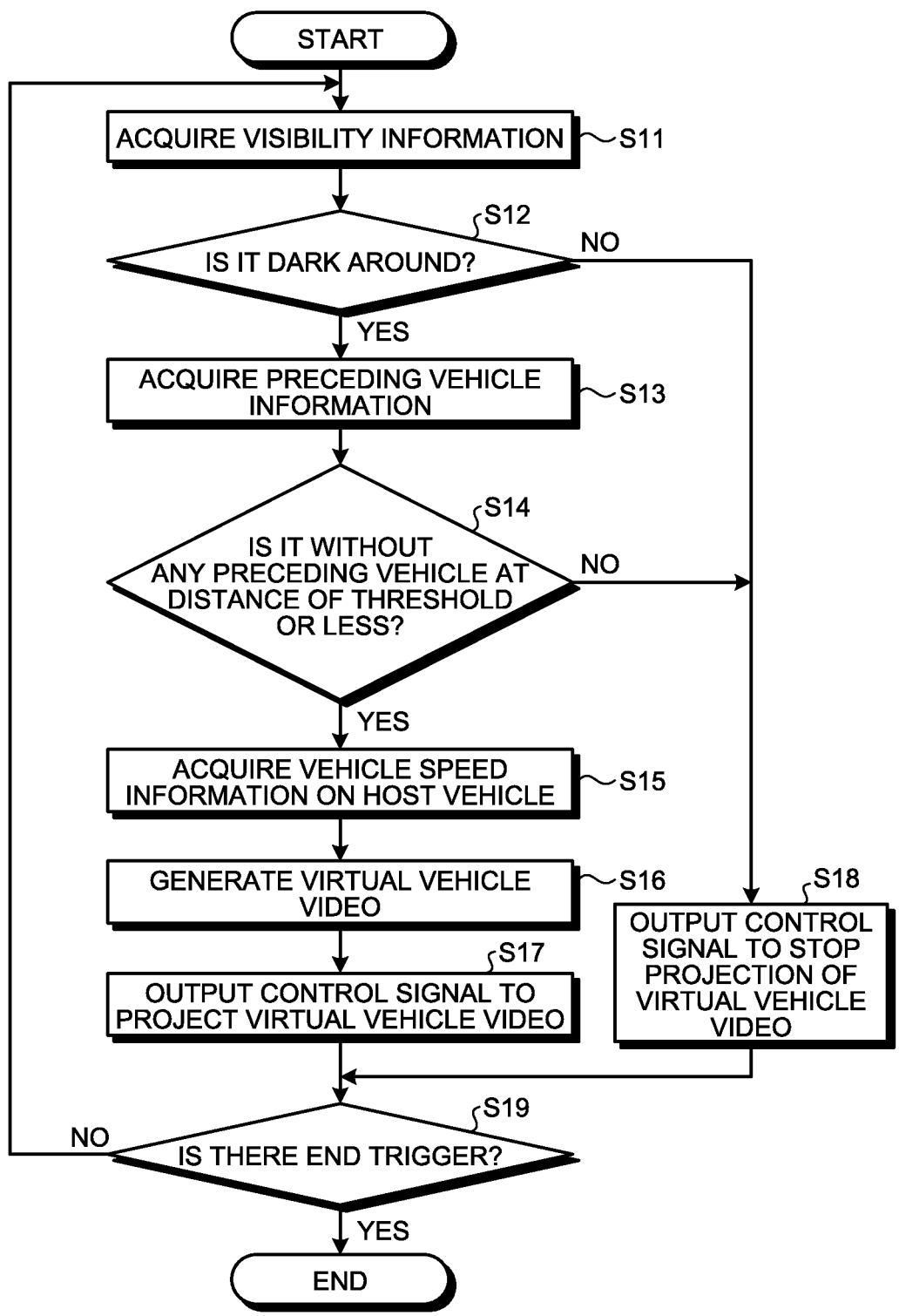
FIG. 7 is a flowchart illustrating the flow of processing in the vehicular projection control device according to the first embodiment.

Next, with reference to FIG. 7, an explanation will be given of the flow of processing in the vehicular projection control device 30. FIG. 7 is a flowchart illustrating the flow of processing in the vehicular projection control device according to the first embodiment.

The vehicular projection control device 30 acquires the visibility information (step S11). More specifically, the vehicular projection control device 30 performs image processing by the visibility information acquisition part 34 to video data acquired by the video data acquisition part 31, to acquire the visibility information. Then, the vehicular projection control device 30 proceeds to step S12.

The vehicular projection control device 30 determines whether it is dark around the host vehicle V (step S12). The vehicular projection control device 30 determines by the projection control part 39 that it is dark around the host vehicle V (Yes at step S12), when a threshold time or more has elapsed, in a state where the illuminance around the host vehicle V is a threshold illuminance or less on the basis of the visibility information acquired by the visibility information acquisition part 34. Alternatively, the vehicular projection control device 30 determines by the projection control part 39 that it is dark around the host vehicle V (Yes at step S12), when traveling of a threshold distance or more has been made, in a state where the illuminance around the host vehicle V is the threshold illuminance or less on the basis of the visibility information acquired by the visibility information acquisition part 34. Then, the vehicular projection control device 30 proceeds to step S13. The vehicular projection control device 30 determines by the projection control part 39 that it is not dark around the host vehicle V (No at step S12), when the illuminance around the host vehicle V is not the threshold illuminance or less on the basis of the visibility information acquired by the visibility information acquisition part 34. Then, the vehicular projection control device 30 proceeds to step S18.

When it is determined that it is dark around the host vehicle V (Yes at step S12), the vehicular projection control device 30 acquires the preceding vehicle information (step S13). More specifically, the vehicular projection control device 30 performs image processing by the preceding vehicle information acquisition part 33 to video data acquired by the video data acquisition part 31, to detect a preceding vehicle positioned as a photographing object at a distance of a threshold or less from the host vehicle V, and thereby to acquire the detection result as the preceding vehicle information. Then, the vehicular projection control device 30 proceeds to step S14.

The vehicular projection control device 30 determines whether it is without any preceding vehicle at a distance of the threshold or less (step S14). When there is no detection of a preceding vehicle positioned at a distance of the threshold or less from the host vehicle V on the basis of the preceding vehicle information acquired by the preceding vehicle information acquisition part 33, the vehicular projection control device 30 determines that it is without any preceding vehicle at a distance of the threshold or less (Yes at step S14). Then, the vehicular projection control device 30 proceeds to step S15. Where there is detection of a preceding vehicle positioned at a distance of the threshold or less from the host vehicle V on the basis of the preceding vehicle information acquired by the preceding vehicle information acquisition part 33, the vehicular projection control device 30 determines that a preceding vehicle is present at a distance of the threshold or less (No at step S14). Then, the vehicular projection control device 30 proceeds to step S18.

When it is determined that it is without any preceding vehicle at a distance of the threshold or less (Yes at step S14), the vehicular projection control device 30 acquires, as the first vehicle speed, the vehicle speed of the host vehicle V immediately before (step S15). More specifically, the vehicular projection control device 30 acquires, by the projection control part 39, the first vehicle speed used immediately before it is determined that it is dark around the host vehicle V, on the basis of the vehicle information acquired by the vehicle information acquisition part 32 and stored in the internal memory. In other words, the first vehicle speed is a vehicle speed used immediately before it becomes dark around the host vehicle V.

The vehicular projection control device 30 generates a virtual vehicle video (step S16). More specifically, on the basis of the first vehicle speed of the host vehicle V, the vehicular projection control device 30 generates, by the virtual vehicle video generation part 38, the virtual vehicle video that is to be travelling at the first vehicle speed of the host vehicle V and ahead of the host vehicle V by the first distance. Then, the vehicular projection control device 30 proceeds to step S17.

The vehicular projection control device 30 outputs a control signal to project the virtual vehicle video (step S17). More specifically, the vehicular projection control device 30 outputs, by the projection control part 39, the control signal to the projection unit 20 to project the virtual vehicle video generated by the virtual vehicle video generation part 38. Then, the vehicular projection control device 30 proceeds to step S19.

The vehicular projection control device 30 outputs a control signal to stop projection of the virtual vehicle video (step S18). More specifically, when the virtual vehicle video is being projected by the projection control part 39, the vehicular projection control device 30 outputs a control signal to the projection unit 20 to stop projection of the virtual vehicle video. When no virtual vehicle video is being projected by the projection control part 39, the vehicular projection control device 30 keeps a state where no virtual vehicle video is projected. Then, the vehicular projection control device 30 proceeds to step S19.

The vehicular projection control device 30 determines whether there is an end trigger (step S19). For example, the end trigger represents a case where a button for ending display of the virtual vehicle video has been pressed or the vehicle has stopped. When there is an end trigger, the vehicular projection control device 30 determines to end projection of the virtual vehicle video (Yes at step S19), and ends the processing. When there is no end trigger, the vehicular projection control device 30 determines not to end projection of the virtual vehicle video (No at step S19), and executes the processing from step S11 again.

In this way, only when the visibility around the host vehicle V has lowered, the vehicular projection control device 30 projects a virtual vehicle video such that a virtual image 200 of the virtual vehicle video is visually recognized. When the visibility around the host vehicle V has not lowered, the vehicular projection control device 30 does not project a virtual vehicle video.

As described above, in this embodiment, only when the visibility around the host vehicle V has lowered, a virtual vehicle video is projected such that a virtual image 200 of the virtual vehicle video is visually recognized. In this embodiment, when the visibility around the host vehicle V has not lowered, no virtual vehicle video is projected. According to this embodiment, even if the visibility around the host vehicle V is low, the shape of the road ahead of the host vehicle V can be recognized by a virtual image 200 of a virtual vehicle video. Thus, according to this embodiment, even if the visibility around the host vehicle V is low, it is possible to assist the driver to perform driving easier. According to this embodiment, since the visual recognition is given as if a preceding vehicle was present ahead, it is possible to reduce that the driver feels uneasy about traveling, even if the visibility around the host vehicle V is low.

In this embodiment, a virtual vehicle video is projected such that a virtual image 200 of the virtual vehicle video is visually recognized. According to this embodiment, even when no preceding vehicle is present ahead of the host vehicle V, traveling can be performed by following a virtual vehicle as in a case where a preceding vehicle is present.

In this embodiment, a virtual vehicle video is projected that travels at the first vehicle speed used immediately before the visibility around the host vehicle V has lowered. The driver can visually recognize a virtual image 200 of the virtual vehicle video, and thereby travel by following the virtual vehicle that travels at the first vehicle speed. According to this embodiment, when the visibility around the host vehicle V has lowered, it is possible to assist the driver to travel with the vehicle speed of the host vehicle V kept at the first vehicle speed. Thus, according to this embodiment, even if the visibility around the host vehicle V has lowered, it is possible to suppress that the host vehicle V is decelerated unwillingly.

In this embodiment, when no preceding vehicle is present at a distance of a threshold or less, a virtual vehicle video is projected. Further, in this embodiment, when a preceding vehicle comes to be present at a distance of the threshold or less while a virtual vehicle video is projected, projection of the virtual vehicle video is stopped. By adopting this arrangement, in this embodiment, a virtual vehicle video can be projected only when no preceding vehicle is present.

According to this embodiment, it is possible to avoid that a preceding vehicle and a virtual image 200 of a virtual vehicle video overlap with each other and thereby deteriorate the visibility.

Second Embodiment

Figure 8:
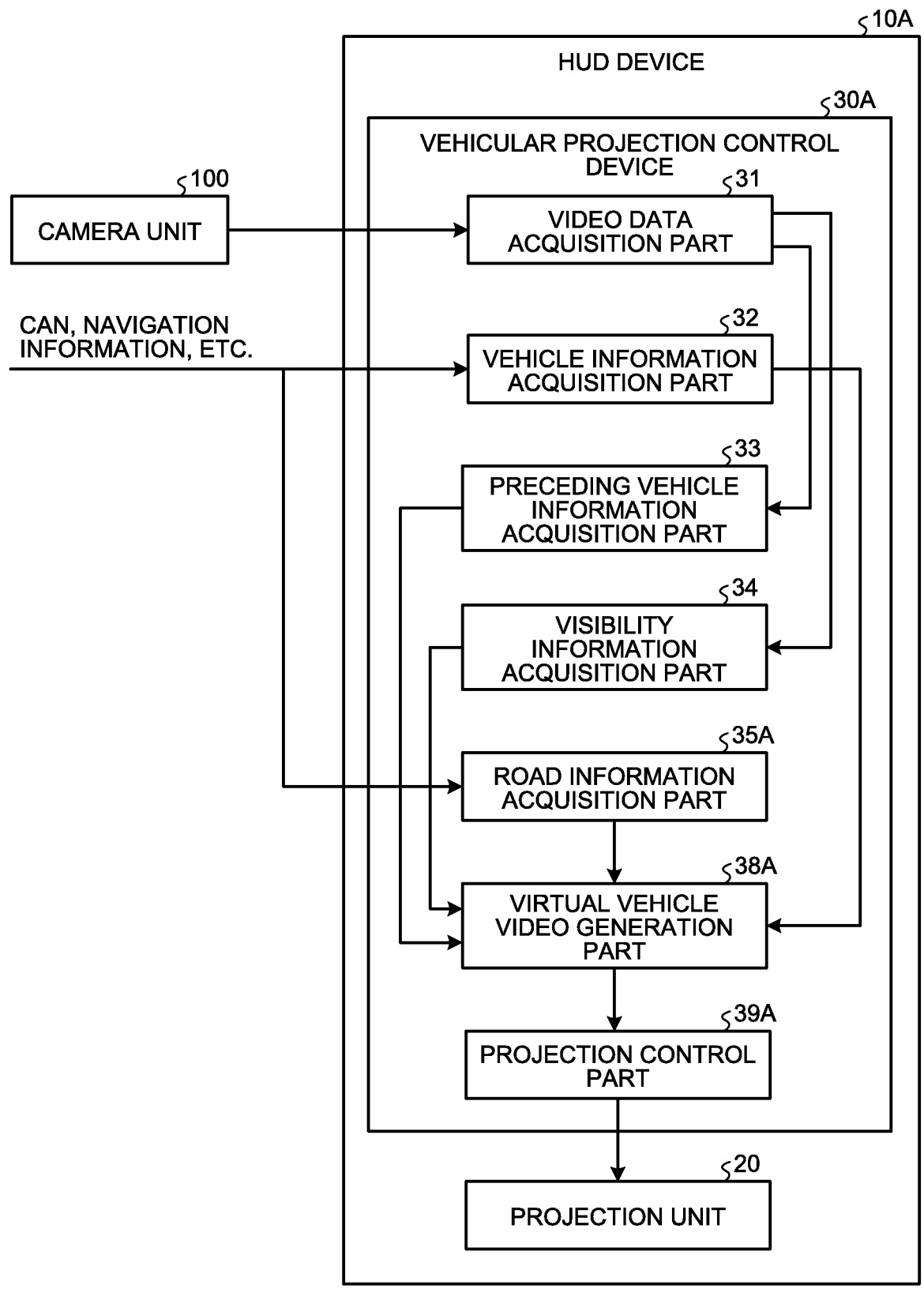
FIG. 8 is a block diagram illustrating a configuration example of a vehicular projection control device according to a second embodiment.
Figure 9:
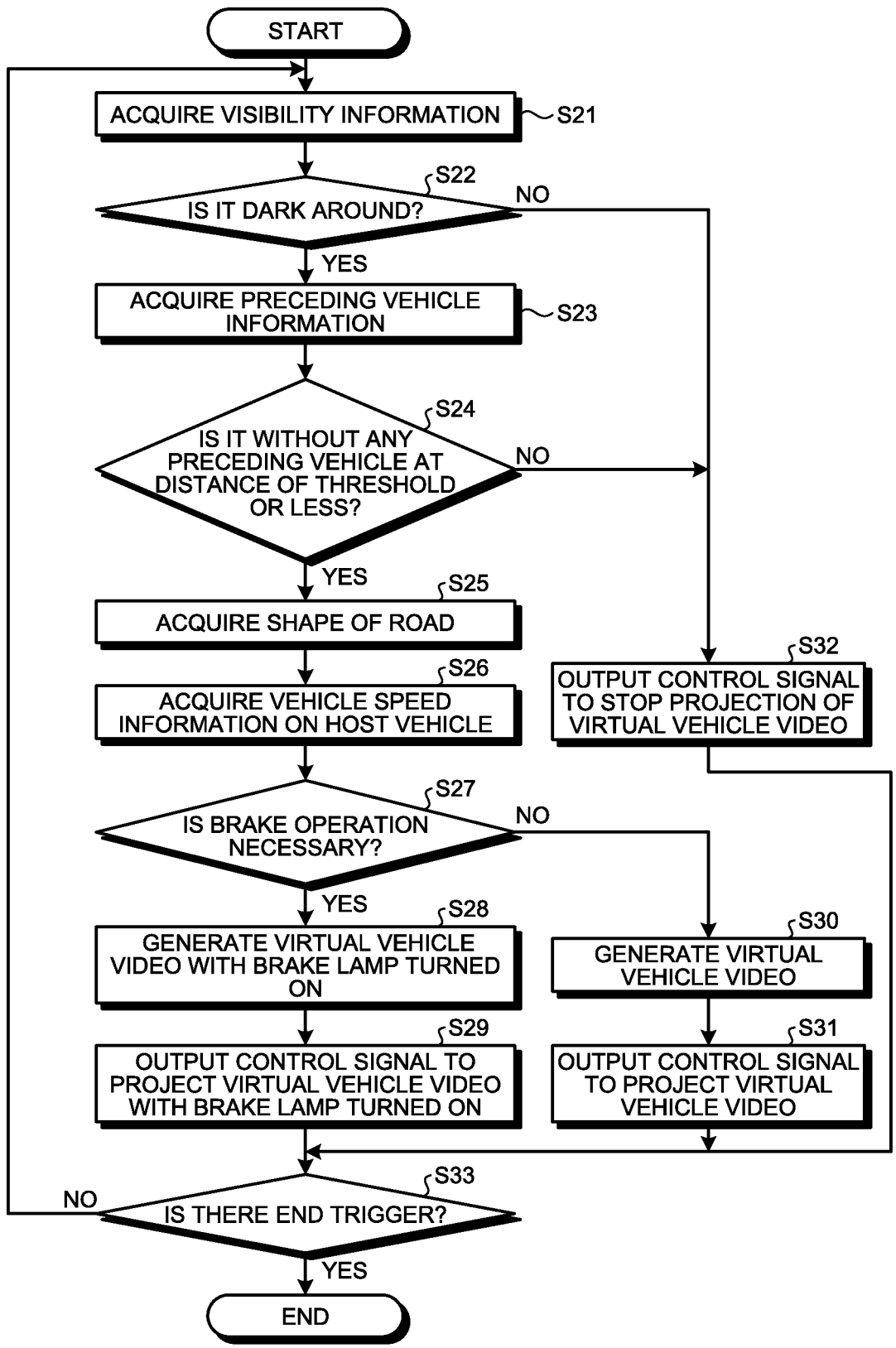
FIG. 9 is a flowchart illustrating the flow of processing in the vehicular projection control device according to the second embodiment.

With reference to FIGS. 8 and 9, an HUD device 10A according to this embodiment will be explained. FIG. 8 is a block diagram illustrating a configuration example of a vehicular projection control device according to a second embodiment. FIG. 9 is a flowchart illustrating the flow of processing in the vehicular projection control device according to the second embodiment. The HUD device 10A has a basis configuration substantially the same as that of the HUD device 10 according to the first embodiment. In the following description, the constituent elements substantially the same as those of the HUD device 10 are denoted by the same reference symbols or corresponding reference symbols, and their detailed description will be omitted.

When the visibility around the host vehicle V has lowered, and further when the host vehicle V needs to operate the brake, a vehicular projection control device 30A projects a virtual vehicle video such that a virtual image 200 of the virtual vehicle video is visually recognized in a display mode capable of confirming that a brake operation is being performed. In this embodiment, the display mode capable of confirming that a brake operation is being performed is a display mode of a virtual vehicle video with the brake lamp turned on. The vehicular projection control device 30A includes a road information acquisition part 35A.

The time when the host vehicle V needs to operate the brake is when the host vehicle V needs to be decelerated. For example, this is a case where there is a downhill at the road ahead of the host vehicle V, or there is a sharp curve ahead of the host vehicle V. For example, this is a case where the vehicle speed of the host vehicle V has become higher than the first vehicle speed by a threshold speed or more.

The road information acquisition part 35A acquires road information indicating the shape of the road ahead of the host vehicle V, on the basis of vehicle information acquired by the vehicle information acquisition part 32 and navigation information acquired from a navigation system. More specifically, the road information acquisition part 35A acquires the road information indicating the shape of the road ahead of the host vehicle V, on the basis of current position information on the host vehicle V and the navigation information.

When the visibility around the host vehicle V has lowered, and further when the host vehicle V needs to operate the brake, on the basis of at least any one of the visibility information acquired by the visibility information acquisition part 34, the vehicle information acquired by the vehicle information acquisition part 32, and the navigation information acquired from the navigation system and containing information on the road on which the host vehicle V travels, a virtual vehicle video generation part 38A generates a virtual vehicle video with the brake lamp turned on, as a display mode capable of confirming that a brake operation is being performed.

When the visibility around the host vehicle V has lowered, and further when the host vehicle V needs to operate the brake, on the basis of at least any one of the visibility information acquired by the visibility information acquisition part 34, the vehicle information acquired by the vehicle information acquisition part 32, and the navigation information acquired from the navigation system and containing information on the road on which the host vehicle V travels, a projection control part 39A outputs a video signal to the projection unit 20 to project the virtual vehicle video generated by the virtual vehicle video generation part 38A, such that a virtual image 200 of the virtual vehicle video with the brake lamp turned on is visually recognized, as a display mode capable of confirming that a brake operation is being performed.

Next, with reference to FIG. 9, an explanation will be given of the flow of processing in the vehicular projection control device 30A. In the flowchart illustrated in FIG. 9, the processing parts of steps S21 to S24, step S26, and steps S30 to S33 are performed as in the processing parts of steps S11 to S14, step S15, and steps S16 to S19 of the flowchart illustrated in FIG. 7, respectively.

When it is determined that it is without any preceding vehicle at a distance of a threshold or less (Yes at step S24), the vehicular projection control device 30A acquires the shape of the road (step S25). More specifically, the vehicular projection control device 30A acquires the shape of the road ahead of the host vehicle V, on the basis of the road information acquired by the road information acquisition part 35A. Then, the vehicular projection control device 30A proceeds to step S26.

The vehicular projection control device 30A determines whether a brake operation is necessary (step S27). When there is a downhill or sharp curve at the road ahead of the host vehicle V, on the basis of the vehicle information acquired by the vehicle information acquisition part 32 and the road information acquired by the road information acquisition part 35A, the vehicular projection control device 30A determines that a brake operation is necessary (Yes at step S27). Alternatively, when the vehicle speed of the host vehicle V has become higher than the first vehicle speed by a threshold speed or more, on the basis of the vehicle information, the vehicular projection control device 30A determines that a brake operation is necessary (Yes at step S27). Then, the vehicular projection control device 30A proceeds to step S28. When there is no downhill or sharp curve at the road ahead of the host vehicle V, and the vehicle speed of the host vehicle V is not higher than the first vehicle speed by the threshold speed or more, the vehicular projection control device 30A determines that no brake operation is necessary (No at step S27). Then, the vehicular projection control device 30A proceeds to step S30.

The vehicular projection control device 30A generates a virtual vehicle video with the brake lamp turned on (step S28). More specifically, on the basis of the first vehicle speed of the host vehicle V, the vehicular projection control device 30A generates, by the virtual vehicle video generation part 38A, the virtual vehicle video with the brake lamp turned on that is to be travelling at a speed lower than the first vehicle speed of the host vehicle V and ahead of the host vehicle V by the first distance.

The vehicular projection control device 30A outputs a control signal to project the virtual vehicle video with the brake lamp turned on (step S29). More specifically, the vehicular projection control device 30A outputs, by the projection control part 39A, the control signal to the projection unit 20 to project the virtual vehicle video with the brake lamp turned on, generated by the virtual vehicle video generation part 38A. Then, the vehicular projection control device 30A proceeds to step S33.

As described above, in this embodiment, when a brake operation is necessary, a virtual vehicle video with the brake lamp turned on is projected. According to this embodiment, as the virtual vehicle video is with the brake lamp turned on, the driver can naturally perform a brake operation to the host vehicle V. According to this embodiment, it is possible to assist the driver to perform an appropriate brake operation, and to assist the host vehicle V to travel at an appropriate vehicle speed.

Third Embodiment

Figure 10:
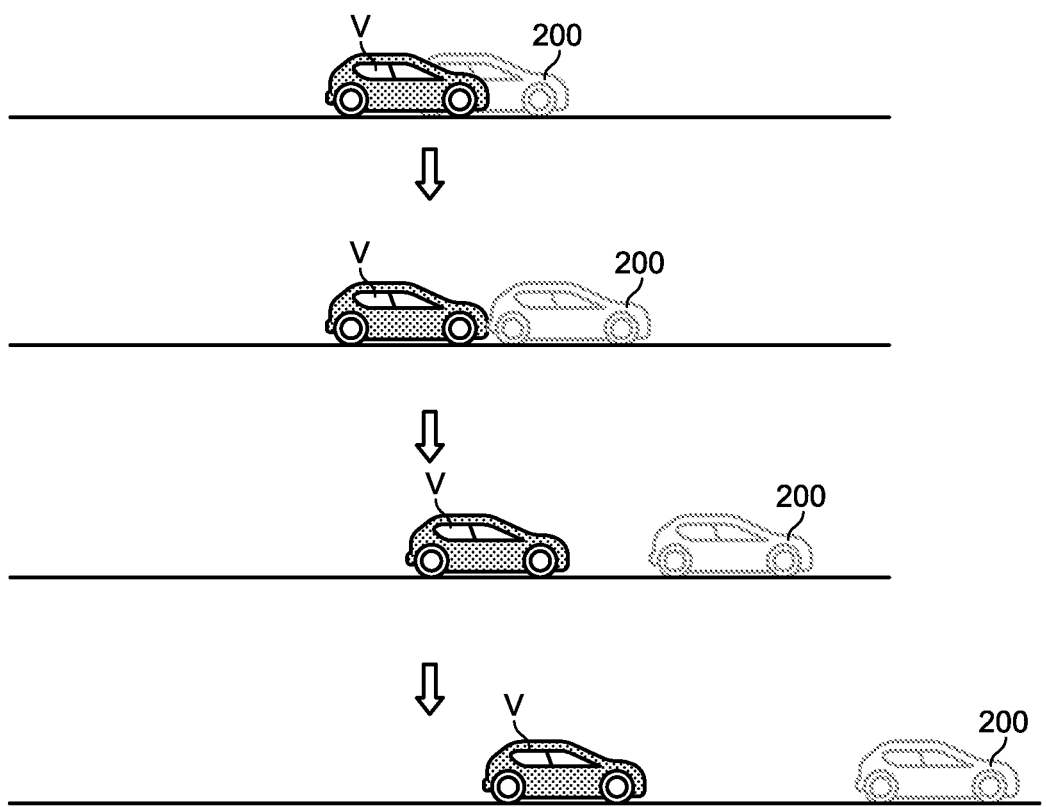
FIG. 10 is a diagram for explaining processing in a vehicular projection control device according to a third embodiment, which illustrates an example where the visibility around the vehicle has lowered.

With reference to FIG. 10, an HUD device 10 according to this embodiment will be explained. FIG. 10 is a diagram for explaining processing in a vehicular projection control device according to a third embodiment, which illustrates an example where the visibility around the host vehicle V has lowered. This HUD device 10 has a basis configuration substantially the same as that of the HUD device 10 according to the first embodiment.

The virtual vehicle video generation part 38 generates a virtual vehicle video that is to separate from the host vehicle V and become more distant forward by the first distance from near the host vehicle V. In this embodiment, the virtual vehicle video generation part 38 generates a virtual vehicle video to be visually recognized by the driver as separating from the host vehicle V and popping up forward.

When the visibility around the host vehicle V has lowered, the projection control part 39 projects the virtual vehicle video generated by the virtual vehicle video generation part 38, which is to be visually recognized as separating from the host vehicle V and becoming more distant forward by the first distance from near the host vehicle V. In this embodiment, when the visibility around the host vehicle V has lowered, the projection control part 39 projects the virtual vehicle video such that a virtual image 200 of the virtual vehicle video is visually recognized as separating from the host vehicle V and popping up forward.

With reference to FIG. 10, an explanation will be given of a virtual image 200 of a virtual vehicle video that is projected when the visibility around the host vehicle V has lowered. Immediately after it is determined that the visibility around the host vehicle V has lowered, a virtual image 200 of a virtual vehicle video is visually recognized as being travelling near the host vehicle V. As time passes, in other words, as the host vehicle V moves forward, the virtual image 200 of the virtual vehicle video is visually recognized as becoming more distant from the host vehicle V. When a predetermined time has elapsed since the projection of the virtual vehicle video, the virtual image 200 of the virtual vehicle video is visually recognized as being travelling ahead by the first distance.

As described above, in this embodiment, when the visibility around the host vehicle V has lowered, a virtual vehicle video is projected such that a virtual image 200 of the virtual vehicle video is visually recognized as separating from the host vehicle V and becoming more distant forward by the first distance from near the host vehicle V. According to this embodiment, it is possible to allow the driver to recognize more easily that the virtual image 200 of the virtual vehicle image has been projected.

According to this embodiment, as the virtual image 200 of the virtual vehicle video is displayed as becoming more distant from the host vehicle V, it is possible to perform travelling by following the virtual vehicle.

The HUD device 10 according to the present disclosure has been described above; however, the present disclosure may be implemented in various different forms other than the above-described embodiments.

Each of the constituent elements of the illustrated HUD device 10 is functionally conceptual and may not necessarily be physically configured as illustrated. In other words, the specific form of each device is not limited to the illustrated form, but all or a part thereof may be functionally or physically separated or integrated in arbitrary units in accordance the processing load or usage situation of each device.

The configuration of the HUD device 10 is realized by, for example, a program loaded in a memory as software. Each of the above embodiments has been described as a functional block realized by cooperation of such hardware and/or software. Thus, each of the functional blocks can be realized in various forms by hardware only, software only, or a combination thereof.

The constituent elements described above include those that can be easily assumed by those skilled in the art, and those that are substantially equivalent. Further, the above-described configurations can be appropriately combined. In addition, various omissions, substitutions, or changes in the configurations are possible without departing from the scope of the present disclosure.

The vehicular projection control device 30 has been described as acquiring current position information of the host vehicle V from a navigation system; however, this is not limiting. The vehicular projection control device 30 may include a current position information acquisition part that acquires current position information of the host vehicle V acquired by a GPS (Global Positioning System) receiver mounted on the vehicle.

The virtual mobile body video generation part has been described as the virtual vehicle video generation part 38; however, this is not limiting. A video generated by the virtual mobile body video generation part may represent a virtual mobile body that is to be moving ahead of the host vehicle V at the first vehicle speed. For example, the virtual mobile body may be an icon, such as an arrow shape or circular shape, which is to be moving in the moving direction of the host vehicle V.

The projection unit 20 may be configured, without using the combiner, to reflect by the windshield S a display video projected on the projection part 21, so as to be recognize as a virtual image 200 by the driver.

In the second embodiment, when the host vehicle V needs to operate the brake, a virtual image 200 of a virtual vehicle video with the brake lamp turned on is visually recognized; however, this is not limiting. For example, the virtual vehicle video may be a video formed by changing the body of the virtual vehicle to red.

As the virtual vehicle video, when it is determined that a speed change amount of the host vehicle V with respect to the first vehicle speed is a threshold or more, a virtual vehicle video may be generated in a display mode capable of confirming a speed change of the host vehicle V. For example, when the host vehicle V has a vehicle speed slower than the first vehicle speed, the virtual vehicle video may be, for example, a video in which the body of the virtual vehicle blinks or the color of the body is thinned. By adopting this arrangement, it is possible to provide an assist to keep the vehicle speed of the host vehicle V more appropriately.

The present disclosure can also be implemented as a vehicular projection control method. More specifically, a vehicular projection control method according to the present disclosure comprises: a vehicle information acquisition step of acquiring vehicle information containing a vehicle speed of a host vehicle; a preceding vehicle information acquisition step of acquiring preceding vehicle information indicating the presence or absence of a preceding vehicle; a visibility information acquisition step of acquiring visibility information on a road on which the host vehicle travels; a virtual mobile body video generation step of generating a virtual mobile body video of a virtual mobile body, which is to be projected by a projection unit of a head-up display device as being moving ahead of the host vehicle V in the same direction as the host vehicle; and a projection control step of controlling projection of the virtual mobile body video by the projection unit of the head-up display device, such that a virtual image of the virtual mobile body video generated by the virtual mobile body video generation step is visually recognized in front of the host vehicle, wherein, when it is determined that visibility around the host vehicle has lowered on the basis of the visibility information acquired by the visibility information acquisition step, the projection control step controls projection of the virtual mobile body video, such that a virtual image of the virtual mobile body video generated by the virtual mobile body video generation step is visually recognized in front of the host vehicle.

The present disclosure can also be implemented as a program. More specifically, a program according to the present disclosure causes a computer, which operates as a vehicular projection control device, to execute: a vehicle information acquisition step of acquiring vehicle information containing a vehicle speed of a host vehicle; a preceding vehicle information acquisition step of acquiring preceding vehicle information indicating the presence or absence of a preceding vehicle; a visibility information acquisition step of acquiring visibility information on a road on which the host vehicle travels; a virtual mobile body video generation step of generating a virtual mobile body video of a virtual mobile body, which is to be projected by a projection unit of a head-up display device as being moving ahead of the host vehicle V in the same direction as the host vehicle; and a projection control step of controlling projection of the virtual mobile body video by the projection unit of the head-up display device, such that a virtual image of the virtual mobile body video generated by the virtual mobile body video generation step is visually recognized in front of the host vehicle, wherein, when it is determined that visibility around the host vehicle has lowered on the basis of the visibility information acquired by the visibility information acquisition step, the projection control step controls projection of the virtual mobile body video, such that a virtual image of the virtual mobile body video generated by the virtual mobile body video generation step is visually recognized in front of the host vehicle.

According to the present disclosure, there is an effect to provide an assist to facilitate driving when the visibility is low.

What is claimed is:

1. A vehicular projection control device comprising:
 a memory that stores a program that comprises instructions; and
 a processor that executes the instructions, wherein the instructions cause the vehicular projection control device to operate as:
  a vehicle information acquirer configured to acquire vehicle information containing a vehicle speed of a host vehicle;
  a visibility information acquirer configured to acquire visibility information on a road on which the host vehicle travels;
  a virtual mobile body video generator configured to generate a virtual mobile body video of a virtual mobile body, which is to be projected by a projection unit of a head-up display device as being moving ahead of the host vehicle in a same direction as the host vehicle;
a projection controller configured to control projection of the virtual mobile body video by the projection unit of the head-up display device, such that a virtual image of the virtual mobile body video generated by the virtual mobile body video generator is visually recognized in front of the host vehicle; and
a video data acquirer configured to acquire video data from an image capturer for capturing a front of the host vehicle,
wherein the projection controller controls projection of the virtual mobile body video, on a basis of the visibility information acquired by the visibility information acquirer,
the visibility information acquirer acquires the visibility information, on a basis of video data acquired by the video data acquirer,
when it is determined that visibility around the host vehicle has lowered on a basis of the visibility information acquired by the visibility information acquirer, the projection controller controls projection of the virtual mobile body video, such that a virtual image of the virtual mobile body video generated by the virtual mobile body video generator is visually recognized in front of the host vehicle,
the visibility information acquirer acquires, as the visibility information, lighting information indicating intervals between lighting devices around the host vehicle, on the basis of video data acquired by the video data acquirer, and
when it is determined that the intervals between lighting devices around the host vehicle are wider than a threshold on a basis of the visibility information acquired by the visibility information acquirer, the projection controller controls projection of the virtual mobile body video, such that a virtual image of the virtual mobile body video generated by the virtual mobile body video generator is visually recognized in front of the host vehicle.

2. The vehicular projection control device according to claim 1, wherein the virtual mobile body is at a speed that is a speed of the host vehicle used immediately before it is determined that visibility around the host vehicle has lowered.

3. The vehicular projection control device according to claim 1, wherein
the visibility information acquirer acquires, as the visibility information, illuminance information indicating illuminance around the host vehicle, on the basis of video data acquired by the video data acquirer, and
when it is determined that the illuminance around the host vehicle has lowered on a basis of the visibility information acquired by the visibility information acquirer, the projection controller controls projection of the virtual mobile body video, such that a virtual image of the virtual mobile body video generated by the virtual mobile body video generator is visually recognized in front of the host vehicle.

4. The vehicular projection control device according to claim 1, wherein the instructions further cause the vehicular projection control device to operate as a detection result acquirer configured to acquire a detection result from an illuminance sensor for detecting illuminance around the host vehicle, wherein
the visibility information acquirer acquires, as the visibility information, illuminance information indicating illuminance around the host vehicle, on a basis of the detection result acquired by the detection result acquirer, and
when it is determined that the illuminance around the host vehicle has lowered on a basis of the visibility information acquired by the visibility information acquirer, the projection controller controls projection of the virtual mobile body video, such that a virtual image of the virtual mobile body video generated by the virtual mobile body video generator is visually recognized in front of the host vehicle.

5. The vehicular projection control device according to claim 1, wherein
when visibility around the host vehicle has lowered and when a brake operation is necessary, on a basis of at least any one of the visibility information acquired by the visibility information acquirer, the vehicle information acquired by the vehicle information acquirer, and navigation information acquired from a navigation system and containing information on the road on which the host vehicle travels, the virtual mobile body video generator generates a virtual vehicle video in a display mode capable of confirming that a brake operation is being performed by a virtual vehicle, and
when illuminance around the host vehicle has lowered and a brake operation is necessary, on a basis of at least any one of the visibility information acquired by the visibility information acquirer, the vehicle information acquired by the vehicle information acquirer, and the navigation information acquired from the navigation system and containing information on the road on which the host vehicle travels, the projection controller controls projection of the virtual mobile body video, such that a virtual image of the virtual mobile body video generated by the virtual mobile body video generator is visually recognized in front of the host vehicle, in the display mode capable of confirming that a brake operation is being performed.

6. The vehicular projection control device according to claim 1, wherein
the virtual mobile body video generator generates the virtual mobile body video of the virtual mobile body to separate from the host vehicle and become more distant forward by a predetermined distance from near the host vehicle, and
when it is determined that visibility around the host vehicle has lowered on a basis of the visibility information acquired by the visibility information acquirer, the projection controller controls projection of the virtual mobile body video generated by the virtual mobile body video generator, such that a virtual image of the virtual mobile body video generated by the virtual mobile body video generator is visually recognized as separating from the host vehicle and becoming more distant forward by the predetermined distance from near the host vehicle.

7. The vehicular projection control device according to claim 1, wherein
when it is determined that a speed change amount of the host vehicle, with respect to a speed of the host vehicle used immediately before it is determined that visibility around the host vehicle has lowered, is a threshold or more, on a basis of the vehicle information acquired by the vehicle information acquirer, the virtual mobile body video generator generates a virtual vehicle video in a display mode capable of confirming a speed change of the host vehicle, and when it is determined that a speed change amount of the host vehicle, with respect to the speed of the host vehicle used immediately before it is determined that visibility around the host vehicle has lowered, is the threshold or more, on a basis of the vehicle information acquired by the vehicle information acquirer, the projection controller controls projection of the virtual mobile body video, such that a virtual image of the virtual mobile body video generated by the virtual mobile body video generator is visually recognized in front of the host vehicle, in the display mode capable of confirming a speed change of the host vehicle.

8. A head-up display device comprising:

a vehicular projection control device according to claim 1; and the projection unit.

* * * * *